W. J. GALT, Jr.
SOCKET MEMBER FOR SNAP FASTENERS.
APPLICATION FILED DEC. 10, 1917.
1,362,690.
Patented Dec. 21, 1920.
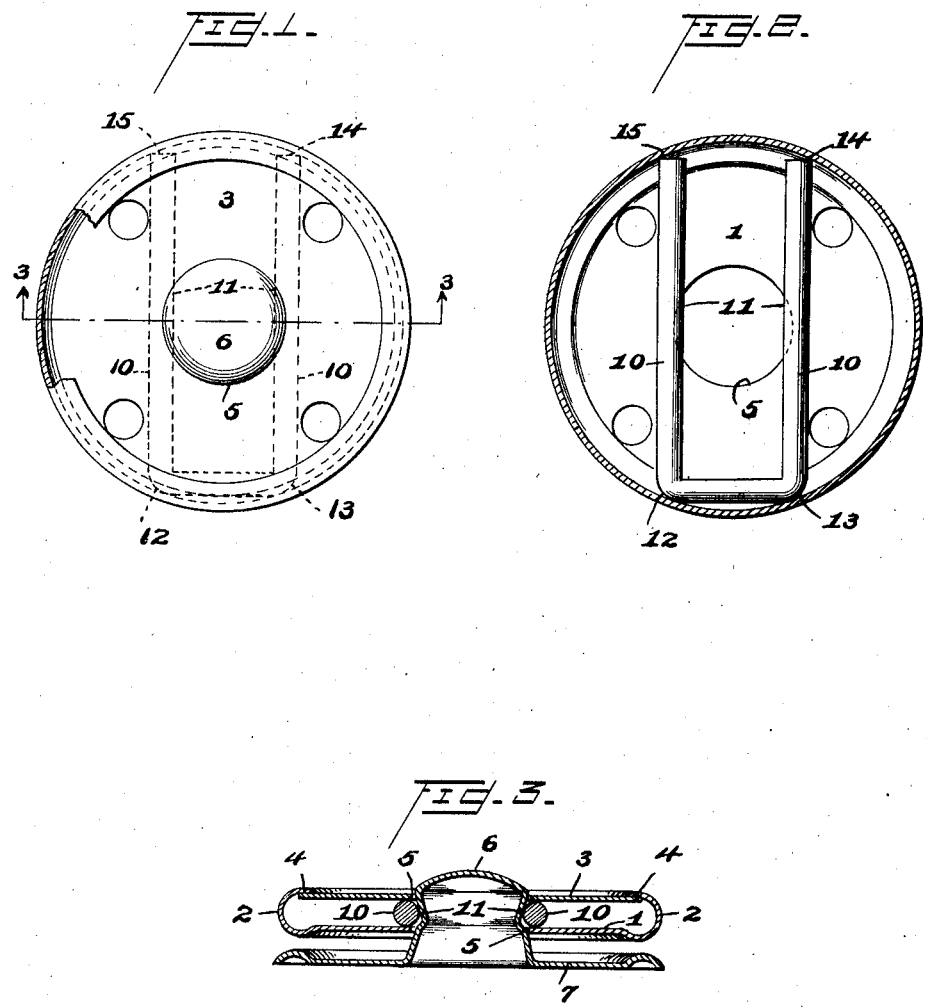

UNITED STATES PATENT OFFICE.

WILLIAM J. GALT, JR., OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SOCKET MEMBER FOR SNAP-FASTENERS.

1,362,690.      Specification of Letters Patent.     Patented Dec. 21, 1920.

Application filed December 10, 1917. Serial No. 206,414.

*To all whom it may concern:*

Be it known that I, WILLIAM J. GALT, Jr., a citizen of the United States, residing in the city and county of Philadelphia, State of Pennsylvania, have invented certain new and useful Improvements in Socket Members for Snap-Fasteners, of which the following is a specification.

My invention relates to socket members for snap fasteners of the type in which a spring is provided for engaging the stud of a ball or stud member of the fastener to hold the two members in engagement with each other.

The objects of my invention are to provide a simplified and improved construction of socket member for a snap fastener; to provide an improved construction of spring for said member, said spring being substantially of U-shape and preferably being in contact with the edges of the said socket member at its opposite ends; and also to secure the said spring in place within the said socket member so that its opposite side portions with which the head or stud of a stud member contacts as it is placed in engagement with and disengaged from the socket member are free to move laterally, thereby affording great efficiency and ease of operation.

Other objects and advantages of my invention will be referred to and pointed out in the detail description thereof which follows or will be apparent from such description.

In the accompanying drawing in which I have illustrated one form of a convenient embodiment of my invention:—

Figure 1 is a view of one side of the socket member of a fastener with a portion broken away and shown in section;

Fig. 2 is a section taken in a plane substantially parallel with the opposite sides of the socket member and showing the spring in position therein; and Fig. 3 is a transverse sectional view taken on the line 3—3 of Fig. 1.

Referring to the drawing, 1 designates one of the sides of the socket member of a snap fastener having its edges bent upwardly, as indicated at 2, and inwardly to overlie the outer edge of the side 3, as shown at 4. The socket member as a whole is preferably of disk shape as shown and is provided with a central opening or aperture 5 through which the head or stud 6 of the stud member 7 may be inserted from either side.

10 designates a U-shaped spring which is situated in a chamber within the upturned edge 2 of the plate 1. The opposite ends of said spring extend underneath the inwardly turned portion 4 of said plate 1 and preferably are in contact with the upturned edge 2, as is shown in Figs. 1 and 2 of the drawing. The opposite sides or arms of the U-shaped spring 10 are preferably substantially parallel with each other as shown in the drawing. The spring 10 is held between the plates 1 and 3 with sufficient looseness to permit the sides or arms thereof to move freely laterally, that is, in the plane of the socket member.

The normal distance between the sides or arms of the said spring is somewhat less than the diameter of the head or stud 6 of the stud member 7 of the fastener so that when the two members of the fastener are pressed together or pulled apart the said head or stud will force the said arms or sides apart.

The ball and socket members are held in assembled relation by the engagement of the arms with the neck of the said stud or head, as indicated at 11.

Preferably, as already stated, the opposite ends of the spring contact with the upwardly extending edge portion 2 of the plate 1, such contact taking place at the points 12, 13, 14 and 15. The extremities of the free ends of the arms or sides of the spring being in contact with the upwardly extended edge 2 of the socket member, as shown in the drawing, the passage of the head or stud 6 between the said arms or sides will bow the same from their extremities to the closed end of the spring. This will be true no matter from which side of the socket member the stud member is inserted because the arms of the spring are substantially straight and held as described at their opposite ends.

I claim:—

1. A snap fastener socket member comprising a disk-like member having an aperture to receive the head of the stud member of such fastener from either side of itself and provided with a chamber and a U-shaped spring with substantially straight arms seated in said chamber, said arms normally overlying opposite edges of the aperture and the said member comprising means for retaining the spring in said chamber and the arms of said spring being adapted to act with substantially the same bowing tension whichever side of the socket member the stud member is inserted from.

2. A snap fastener socket member comprising a disk-like member having an aperture extending therethrough to receive from either side of itself the head of a stud member and provided with a chamber and a U-shaped spring with substantially straight arms seated in such chamber with the extremities of the free ends of its arms in contact with the inner side of the edge of said disk-like member and with the said arms normally overlying opposite edges of the aperture, whereby the arms of the said spring always act with a substantially constant bowing tension whichever side of the socket member the head of the stud member is inserted from.

3. A snap fastener socket member comprising a disk-like plate having its edges turned upwardly and extended inwardly and being provided with an aperture therethrough and a U-shaped spring with substantially straight arms lying in contact with said plate and having its opposite ends projected underneath the inwardly extended edge portion and the arms of said spring normally overlying opposite edges of the aperture and the extremities of the free ends thereof being in contact with the said upwardly turned edge, whereby the arms of said spring always act with substantially the same bowing tension whichever side of the socket member the stud member is inserted from.

4. A socket member for a snap fastener comprising a plate having its outer edge turned upwardly and inwardly, a plate arranged in parallel relation to said plate and having its edge situated underneath the inwardly extended edge portion of the first named plate, said plate having a central aperture therethrough, and a U-shaped spring with substantially straight arms situated between the said plates and having the extremities of the free ends of its arms normally practically in contact with the said upwardly extended edge, whereby the arms of the spring always act with a substantially constant bowing tension whichever side of the socket member the stud member is inserted from.

In testimony that I claim the foregoing as my invention, I have hereunto signed my name this 7th day of December, A. D. 1917.

WILLIAM J. GALT, Jr.